(12) United States Patent
Murakami et al.

(10) Patent No.: US 9,785,453 B2
(45) Date of Patent: Oct. 10, 2017

(54) STORAGE MEDIUM HAVING STORED THEREIN INFORMATION PROCESSING PROGRAM, INFORMATION PROCESSING APPARATUS, INFORMATION PROCESSING METHOD, AND INFORMATION PROCESSING SYSTEM

(75) Inventors: Yutaka Murakami, Kyoto (JP); Akio Terui, Kyoto (JP); Minoru Hatamoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1330 days.

(21) Appl. No.: 13/402,991

(22) Filed: Feb. 23, 2012

(65) Prior Publication Data

US 2012/0215518 A1    Aug. 23, 2012

(30) Foreign Application Priority Data

Feb. 23, 2011    (JP) .................. 2011-037628

(51) Int. Cl.
*G06T 1/00*    (2006.01)
*G06F 9/445*   (2006.01)

(52) U.S. Cl.
CPC .............. *G06F 9/44547* (2013.01)

(58) Field of Classification Search
CPC .......... G06T 1/00; G06T 1/20; G06T 2200/28
See application file for complete search history.

(56) References Cited

U.S. PATENT DOCUMENTS

| 8,126,957 B2* | 2/2012 | Gowen et al. ............... 709/202 |
| 2002/0046229 A1* | 4/2002 | Yutaka et al. ............... 709/102 |
| 2002/0154214 A1* | 10/2002 | Scallie et al. .................. 348/51 |
| 2007/0013702 A1* | 1/2007 | Hiroi et al. ................... 345/502 |
| 2010/0014781 A1* | 1/2010 | Liu et al. ..................... 382/285 |
| 2010/0266198 A1* | 10/2010 | Kim et al. .................... 382/154 |

FOREIGN PATENT DOCUMENTS

| JP | 2001-314644 | 11/2001 |
| JP | 2007-48269 | 2/2007 |

OTHER PUBLICATIONS

Guttenbrunner et al. "Keeping the Game Alive: Evaluation STrategies for the PReservation of Console Video Games", 2010 International Jouranl of Digital Curation, Issue 1, vol. 5, pp. 64-90.*
Duncan, Jeremy. "Avisynth code to convert 2D to 3D. Also how to watch in 3D" Dec. 11, 2010, 4 pages, acceds at 3dvision-blog.com/forum/viewtopic.php?f=22&t=645.*

* cited by examiner

*Primary Examiner* — Suzanne Lo
(74) *Attorney, Agent, or Firm* — Nixon & Vanderhye PC

(57) ABSTRACT

A normal mode is a processing mode in which processing based on a first architecture for an information processing method is executed, and a compatible mode is a processing mode in which processing based on a second architecture for another information processing method is executed. In the normal mode, first result data obtained by executing the processing based on the first architecture is inputted to an output section configured to output inputted data to a user. In the compatible mode, second result data obtained by executing the processing based on the second architecture is inputted to the output section, in a manner adapting the second result data to input of the output section.

17 Claims, 8 Drawing Sheets

F I G. 5
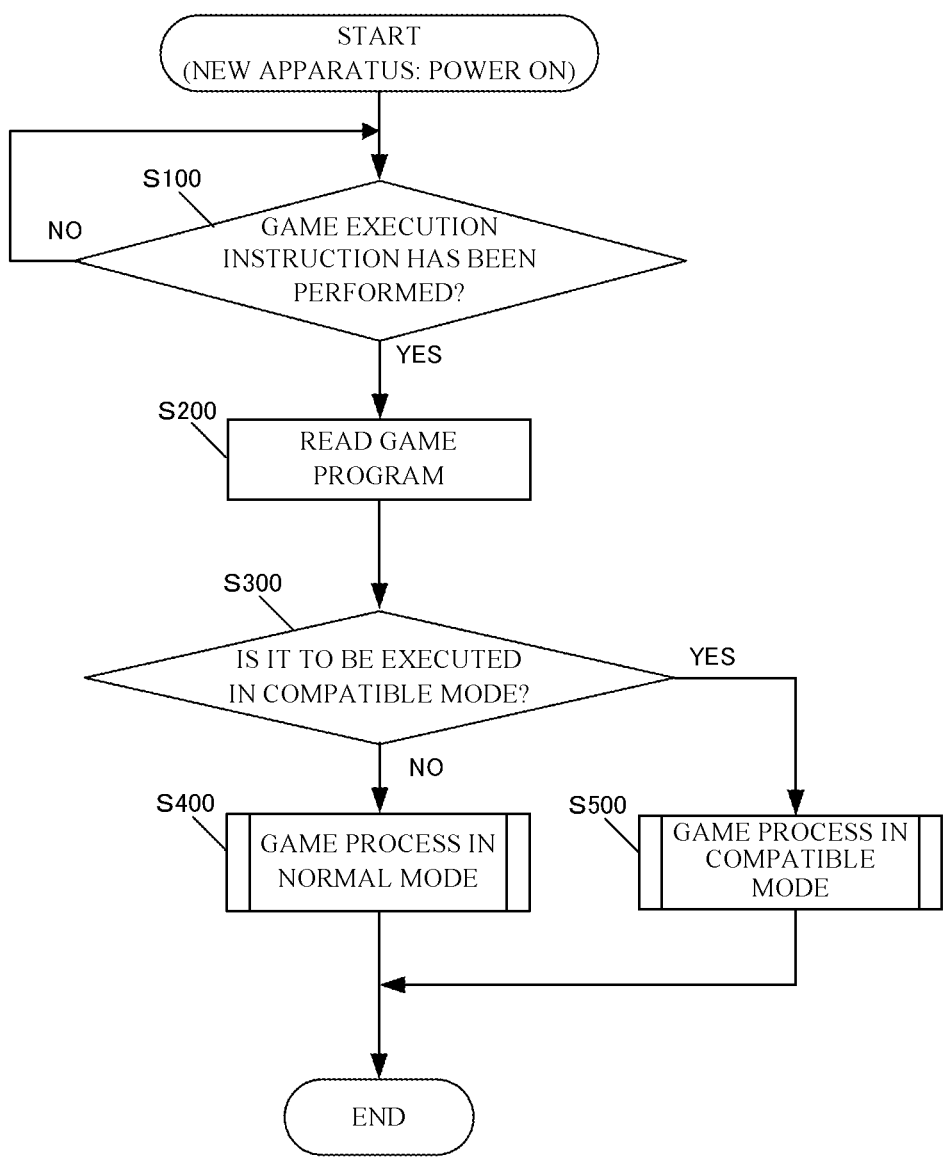

STORAGE MEDIUM HAVING STORED THEREIN INFORMATION PROCESSING PROGRAM, INFORMATION PROCESSING APPARATUS, INFORMATION PROCESSING METHOD, AND INFORMATION PROCESSING SYSTEM

CROSS REFERENCE TO RELATED APPLICATION

The disclosure of Japanese Patent Application No. 2011-037628, filed on Feb. 23, 2011, is incorporated herein by reference.

BACKGROUND

Field

The exemplary embodiments relate to a storage medium having stored therein an information processing program, an information processing apparatus, information processing method, and an information processing system, and more specifically, to a storage medium having stored therein an information processing program that enables execution of software for earlier generation and is executed by a later-generation apparatus, and the like.

Background and Summary

Among various information processing apparatuses represented by a game apparatus, next generation apparatuses (hereinafter, may be referred to as an "old apparatus") may be produced along with the advance of hardware performance and the like. In this case, by using a method disclosed in a certain document, such a next generation apparatus may have compatibility so as to be capable of executing software for earlier generation apparatus (hereinafter, may be referred to as a "new apparatus").

However, in the above conventional technique, the new apparatus executes software for old apparatus and then performs emulation, thereby generating a display image. Therefore, in the above conventional technique, the display image depends on the perfection level of emulation. Typically, in the case where a GPU of the new apparatus, which draws a display image, has a configuration (architecture) to use a different drawing method from that of a GPU of the old apparatus, the conventional technique can generate only a display image with a low perfection level. Moreover, in the case where their drawing methods are completely different from each other, the conventional technique cannot execute software for old apparatus and generate a display image.

Therefore, a feature of the exemplary embodiments is to provide an information processing apparatus and the like that are capable of, even if a drawing unit (GPU) of a new apparatus has a configuration (architecture) to use a different drawing method from that of a drawing unit (GPU) of an old apparatus, executing software for the old apparatus and generating a display image with a high perfection level.

The exemplary embodiments have the following aspects in order to solve the above problems.

One aspect of the exemplary embodiments is a computer-readable storage medium having stored therein an information processing program which is executed by a computer of an information processing apparatus capable of executing processing in a normal mode and a compatible mode, the information processing program causing the computer to function as a first processing section, and a second processing section. The normal mode is a processing mode in which processing based on a first architecture for the information processing apparatus is executed. The compatible mode is a processing mode in which processing based on a second architecture for another information processing apparatus, which is different from the first architecture, is executed. The first processing section is configured to execute the processing based on the first architecture. The second processing section is configured to execute the processing based on the second architecture. In the normal mode, the first processing section inputs first result data obtained by executing the processing based on the first architecture, to an output section configured to output inputted data to a user. In the compatible mode, the second processing section inputs second result data obtained by executing the processing based on the second architecture, to the first processing section, and the first processing section inputs the second result data inputted from the second processing section, to the output section, in a manner adapting the second result data to input of the output section.

According to the above aspect, in the compatible mode, the second processing section executes processing based on the second architecture for the other information processing apparatus. Therefore, the information processing apparatus can obtain the same result data (the second result data) as that obtained by the other information processing apparatus executing processing based on the second architecture. In addition, the second result data is adapted to the output section and then inputted to the output section. Therefore, since emulation is not performed as in conventional technique, the processing result does not depend on the perfection level of emulation. Moreover, even if the information processing apparatus and the other information processing apparatus are much different in their architectures (design concept or process method), the information processing apparatus can execute software (program) for the other information processing apparatus and surely provide substantially the same output as that of the other information processing apparatus, to a user. It is noted that as an example, the first processing section will be assumed to be a CPU 311 and a GPU 313 in an embodiment described later. In addition, as an example, the second processing section will be assumed to be a CPU 312 and a GPU 314 in the embodiment described later.

In another aspect, the first architecture and the second architecture may be architectures for generating images. The first result data and the second result data may be image data. The output section may display an image to a user.

According to the above aspect, in image generation processing, the information processing apparatus can execute software for the other information processing apparatus and surely output substantially the same image as that by the other information processing apparatus, to a user, without depending on the perfection level of emulation, unlike conventional technique.

In another aspect, the first architecture may be an architecture for generating a 3-dimensional CG image by 3-dimensional computer graphics. The second architecture may be an architecture for generating a 2-dimensional CG image by 2-dimensional computer graphics.

According to the above aspect, the information processing apparatus which performs drawing processing using 3-dimensional computer graphics can execute software for the other information processing apparatus, which software realizes drawing processing using 2-dimensional computer graphics, and can surely output substantially the same image as that by the other information processing apparatus, to a user, without depending on the perfection level of emulation, unlike conventional technique.

In another aspect, the first processing section may include: a first drawing section configured to generate data of a 3-dimensional CG image by 3-dimensional computer graphics, as the first result data; and a first operation section configured to perform operation of determining the content of the 3-dimensional CG image, and instruct the first drawing section to generate data of the 3-dimensional CG image corresponding to the determined content. The second processing section may include: a second drawing section configured to generate data of a 2-dimensional CG image by 2-dimensional computer graphics, as the second result data; and a second operation section configured to perform operation of determining the content of the 2-dimensional CG image, and instruct the second drawing section to generate data of the 2-dimensional CG image corresponding to the determined content.

According to the above aspect, the information processing apparatus includes the second operation section and the second drawing section which are the same as those of the other information processing apparatus, and in the compatible mode, generates a display image by using 2-dimensional CG image data generated by the second operation section and the second drawing section. Therefore, the information processing apparatus can surely output substantially the same image as that by the other information processing apparatus, to a user. It is noted that as an example, the first drawing section and the first operation section will be assumed to be the GPU 313 and the CPU 311, respectively, in the embodiment described later. In addition, as an example, the second drawing section and the second operation section will be assumed to be the GPU 314 and the CPU 312, respectively, in the embodiment described later.

In another aspect, the instruction manner in which the first operation section instructs the first drawing section to generate data of the 3-dimensional CG image may be different from the instruction manner in which the second operation section instructs the second drawing section to generate data of the 2-dimensional CG image.

The information processing apparatus includes the second operation section and the second drawing section which are the same as those of the other information processing apparatus, and in the compatible mode, generates a display image by using 2-dimensional CG image data generated by the second operation section and the second drawing section. Therefore, even if the instruction manners are different from each other as described above, the information processing apparatus can surely output substantially the same image as that by the other information processing apparatus, to a user.

In another aspect, in the compatible mode, the first processing section may perform predetermined additional processing for the second result data inputted from the second processing section, and may input the second result data to the output section, in the manner adapting the second result data to input of the output section.

According to the above aspect, it is possible to perform various additional processings for the second result data.

In another aspect, the predetermined additional processing may be processing of adding a predetermined image to an image represented by the second result data.

According to the above aspect, it is possible to provide various types of visual information to a user in the compatible mode. In addition, if the image to be added includes an operation button, the image can be used as a user interface. In the embodiment described later, a home transfer determination image is used as an example of such an image to be added.

In another aspect, the predetermined additional processing may be processing of performing predetermined image adjustment for an image represented by the second result data.

According to the above aspect, it is possible to additionally perform, in the compatible mode, image adjusting processing which is not performed in the other information processing apparatus. In the embodiment described later, image processing of brightness-relevant adjustment is performed in order to prevent photosensitive epilepsy, as an example of the image adjustment processing.

In another aspect, the other information processing apparatus may be of the same type as the information processing apparatus, and may be an older generation apparatus than the information processing apparatus.

According to the above aspect, even if the information processing apparatus is of a type in which the frequency of generation change is relatively high, the information processing apparatus of the next generation can surely execute software for the information processing apparatus of old generation (earlier generation).

In another aspect, the information processing apparatus may be a game apparatus.

According to the above aspect, by using the game apparatus, a user can surely play software (game program) for earlier generation game apparatus.

In the above, the exemplary embodiments are described using a storage medium having stored therein an information processing program. However, the exemplary embodiments may be applied to an information processing apparatus, an information processing method, or an information processing system.

According to the exemplary embodiments, it is possible to provide an information processing apparatus and the like that are capable of, even if a drawing unit (GPU) of a new apparatus has a configuration (architecture) to use a different drawing method from that of a drawing unit (GPU) of an old apparatus, executing software for the old apparatus and generating a display image with a high perfection level.

These and other objects, features, aspects and advantages of the exemplary embodiments will become more apparent from the following detailed description when taken in conjunction with the accompanying drawings.

BRIEF DESCRIPTION OF THE DRAWINGS

FIG. 5 is a flowchart showing an example of a process executed by the game apparatus 10 for determining in which processing mode a game program that is an execution target is to be executed, a normal mode or a compatible mode;

DETAILED DESCRIPTION OF NON-LIMITING EXAMPLE EMBODIMENTS

Embodiment

Hereinafter, a game apparatus which is an information processing apparatus according to one embodiment of the exemplary embodiments will be described. It is noted that the exemplary embodiments are not limited to such an apparatus. The exemplary embodiments may be applied to an information processing system that realizes the function of such an apparatus, an information processing method performed by such an apparatus, or an information processing program executed by such an apparatus. Moreover, the exemplary embodiments may be applied to a computer-readable storage medium having stored therein the information processing program.

Configuration of Game Apparatus 10 of the Present Embodiment

Hereinafter, the configuration of the game apparatus 10 according to the present embodiment (hereinafter, may be also referred to as a "new apparatus") will be described. The game apparatus 10 is capable of executing a game program stored in an exchangeable memory card or received from a server or another game apparatus, and displaying, on the screen, an image generated by 3-dimensional computer graphics (3DCG), such as an image taken by a virtual camera set in a virtual space. In addition, the game apparatus 10 is capable of executing even a game program for a game apparatus 110 (hereinafter, may be referred to as an "old apparatus") which will be described later with reference to FIG. 2 and the like.

Figure 1:
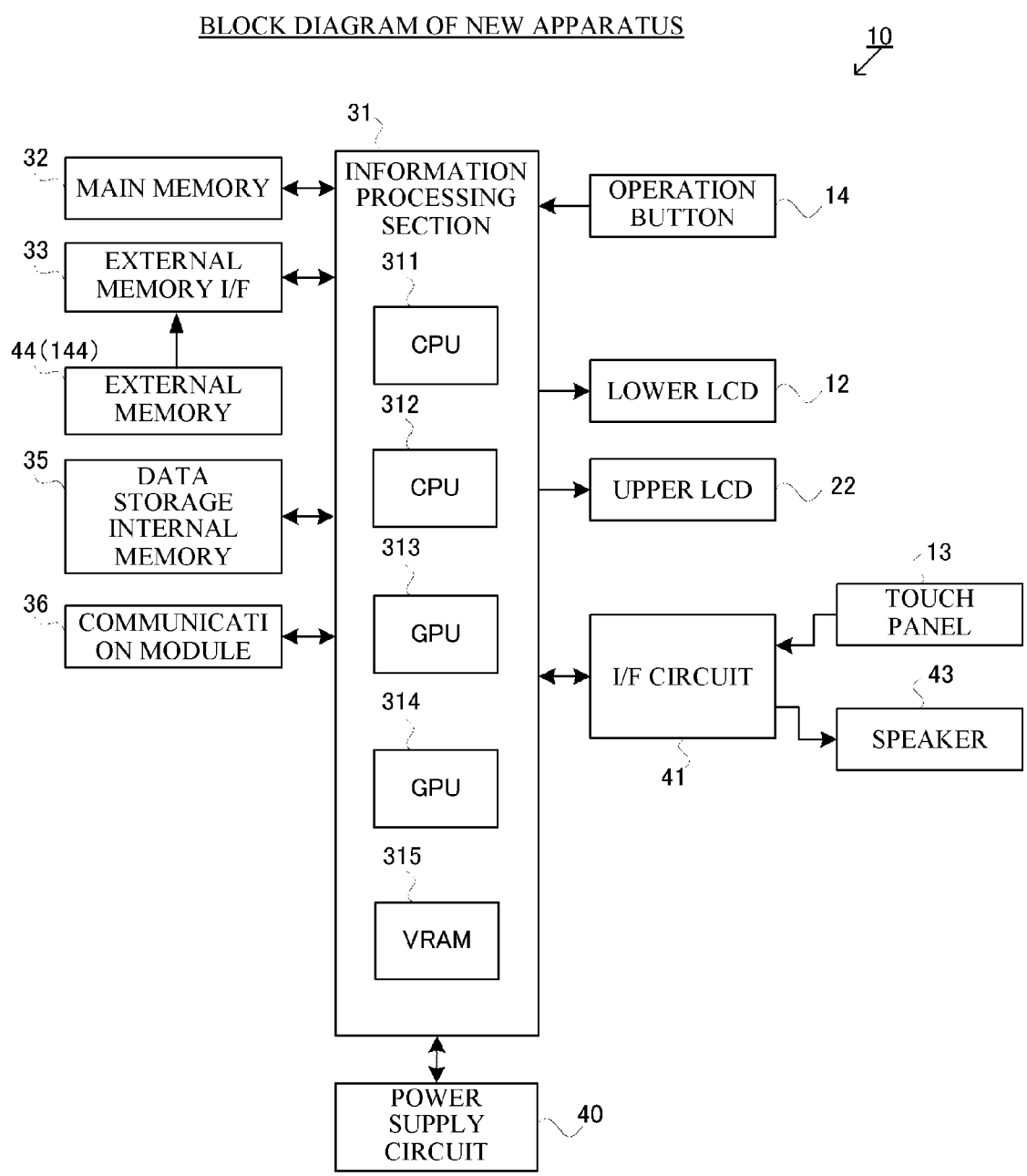
FIG. 1 is a block diagram showing an example of the internal configuration of a game apparatus 10 (new apparatus)

FIG. 1 shows the configuration of the game apparatus 10. As shown in FIG. 1, the game apparatus 10 includes an information processing section 31, a main memory 32, an external memory interface (external memory I/F) 33, a data storage internal memory 35, a communication module 36, a power supply circuit 40, an operation section 14, a lower LCD (Liquid Crystal Display) 12, an upper LCD 22, an interface circuit (I/F circuit) 41, a touch panel 13, and a speaker 43.

The main memory 32, the external memory I/F 33, the data storage internal memory 35, the communication module 36, the power supply circuit 40, the operation section 14, the lower LCD 12, the upper LCD 22, and the interface circuit 41, are connected to the information processing section 31. An external memory 44 (or 144) described later is detachably connected to the external memory I/F 33. The touch panel 13 is connected to the interface circuit 41. Also, the speaker 43 is connected to the interface circuit 41 via an amplifier (not shown).

The information processing section 31 is information processing means including a CPU (Central Processing Unit) 311, a CPU 312, a GPU (Graphics Processing Unit) 313, a GPU 314, and a VRAM (Video RAM) 315.

The CPU 311 executes a game program (hereinafter, may be also referred to as a "new apparatus game program") developed for the game apparatus 10 (new apparatus) and stored in a memory in the game apparatus 10 (for example, the external memory 44 or the data storage internal memory 35 connected to the external memory I/F 33), thereby executing processing based on said game program. The CPU 312 executes a game program (hereinafter, may be also referred to as an "old apparatus game program") developed for the game apparatus 110 (old apparatus) and stored in a memory in the game apparatus 10 (for example, the external memory 144 or the data storage internal memory 35 connected to the external memory I/F 33), thereby executing processing based on said game program. As will be described later with reference to FIG. 2, the CPU 312 of the game apparatus 10 is the same as that of the game apparatus 110 (old apparatus). It is noted that the new apparatus game program and the old apparatus game program may be acquired from another apparatus through communication with the other apparatus.

The GPU 313 is a 3DCG drawing unit having a dedicated circuitry configuration for executing drawing processing by using 3-dimensional computer graphics (3DCG), and generates an image, based on an instruction from the CPU 311. The GPU 314 is a 2DCG drawing unit having a dedicated circuitry configuration for executing drawing processing by using 2-dimensional computer graphics (2DCG), and generates an image, based on an instruction from the CPU 312. The 3-dimensional computer graphics and the 2-dimensional computer graphics are much different in their drawing methods. Therefore, the manner of drawing instructions performed by the CPU 311 to the GPU 313, and the manner of drawing instructions performed by the CPU 312 to GPU 314 are much different from each other. That is, since the architecture of the GPU 313 (or processing by the GPU 313) and the architecture of the GPU 314 (or processing by the GPU 314) are different from each other, the manner of instructions to the GPU 313 and the manner of instructions to the GPU 314 are completely different from each other. For example, the GPU 313 generates an image drawn by taking an image of a 3D object with a virtual camera which (virtually) takes an image of the 3D object, by using information about the vertexes of the 3D object to be drawn and information about the virtual camera, whereas the GPU 314 generates an image drawn by combining 2D images. It is noted that as will be described later with reference to FIG. 2, the GPU 314 of the game apparatus 10 is the same as that of the game apparatus 110 (old apparatus).

The VRAM 315 is a frame buffer, for buffering images generated by the GPU 313 on a frame-by-frame basis, in which the images are drawn. The images drawn in the VRAM 315 are outputted to the upper LCD 22 and the lower LCD 12 by the GPU 313, and displayed on the upper LCD 22 and the lower LCD 12.

The main memory 32 is volatile storage means used as a work area or a buffer area for the information processing section 31 (the CPU 311 or the CPU 312). That is, the main memory 32 is volatile storage means for temporarily storing various types of data used for the process based on a program executed by the CPU 311 or the CPU 312. In the present embodiment, for example, a PSRAM (Pseudo-SRAM) is used as the main memory 32.

The external memory 44 is nonvolatile storage means for storing a new apparatus game program to be executed by the information processing section 31. The external memory 144 is nonvolatile storage means for storing an old apparatus game program to be executed by the information processing section 31. By connecting the external memory 144 to the game apparatus 110 (old apparatus) described later with reference to FIG. 2, the game apparatus 110 can execute the old apparatus game program stored in the external memory 144. The external memories 44 and 144 are each composed of, for example, a read-only semiconductor memory. When the external memory 44 or 144 is connected to the external memory I/F 33, the information processing section 31 can load a program stored in the external memory 44 or 144. A predetermined process is performed by the program loaded by the information processing section 31 being executed.

The data storage internal memory 35 is composed of a non-volatile readable and writable memory (for example, a NAND flash memory), and is used for storing predetermined data. For example, data or a game program (a new apparatus game program or an old apparatus game program) downloaded through the communication module 36 by wireless communication is stored in the data storage internal memory 35.

The communication module 36 has a function of connecting to a wireless LAN by using a method based on, for example, IEEE 802.11b/g standard. In addition, the communication module 36 has a function of performing wireless communication with the same type of game apparatus by a predetermined communication method (for example, communication using a unique protocol, or infrared communication). The information processing section 31 can transmit data to or transmit data from another apparatus via the Internet and can transmit data to or transmit data from the same type of another game apparatus, by using the communication module 36.

The power supply circuit 40 controls power from the power supply (for example, a rechargeable battery not shown) of the game apparatus 10, and supplies power to each unit of the game apparatus 10.

The speaker 43 outputs, as sound, a sound signal outputted from the I/F circuit 41 which has been amplified by an amplifier.

The touch panel 13 is mounted on the screen of the lower LCD 12. In the present embodiment, the touch panel 13 is a touch panel of resistive film type. However, instead of a touch panel of resistive film type, a touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. It is noted that an operation for the touch panel 13 is usually made by using a touch pen which is not shown. However, for example, a finger of a user may be used, instead of a touch pen.

The I/F circuit 41 includes a sound control circuit for controlling the speaker 43 (amplifier), and a touch panel control circuit for controlling the touch panel 13. The sound control circuit performs D/A conversion on the sound signal, and converts the sound signal to a predetermined form of sound data. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation section 14 includes various operation buttons (not shown), and an analog stick (not shown) which is a device for designating a direction. The operation section 14 outputs, to the information processing section 31, operation data indicating the input status of the operation buttons (i.e., whether or not each of them has been pressed). The information processing section 31 acquires the operation data from the operation section 14 to perform processing in accordance with the input on the operation buttons. It is noted that the operation buttons include a "home button" which will be described with reference to FIG. 6 and FIG. 8. In addition, the operation section 14 outputs, to the information processing section 31, operation data indicating an analog input to the analog stick (i.e., an operation direction and an operation amount). The information processing section 31 acquires the operation data from the operation section 14 to perform processing in accordance with the input on the analog stick.

The upper LCD 22 is a display device capable of displaying a stereoscopically visible image (stereoscopic image). In the present embodiment, the number of pixels is 800×240 dots (width×height). An image for a left eye and an image for a right eye having parallax therebetween are displayed in substantially the same display area on the upper LCD 22. Specifically, the upper LCD 22 is a display device using a method in which the image for a left eye and the image for a right eye are alternately displayed in the horizontal direction in predetermined units (for example, every other line), and thus the upper LCD 22 is capable of displaying an image that is stereoscopically visible with naked eyes. In the upper LCD 22, a lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image that is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is contrary to a stereoscopically visible image described above. Specifically, the planner manner is a display mode in which the same displayed image is viewed with both a left eye and a right eye). Thus, the upper LCD 22 is a display device capable of switching between a stereoscopic display mode for displaying a stereoscopically visible image and a planar display mode for displaying an image in a planar manner (for displaying a planar visible image). Alternatively, the upper LCD 22 may be a display device using a method in which the image for left eye and the image for right eye are alternately displayed by time division. Although, in the present embodiment, the upper LCD 22 is a liquid crystal device, a display device using EL (Electro Luminescence), or the like may be used.

The upper LCD 22 displays an image in accordance with an instruction from (the GPU 313 of) the information processing section 31. Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for right eye and an image for left eye, which are stored in the VRAM 315 of the information processing section 31, are outputted to the upper LCD 22. More specifically, the LCD controller alternately repeats processing of reading pixel data of the image for right eye for one line in the vertical direction, and processing of reading pixel data of the image for left eye for one line in the vertical direction, thereby reading, from the VRAM 315, the image for right eye and the image for left eye. Thus, an image to be displayed is divided into images for right eye and images for left eye, each of which is a rectangle-shaped image having one line of pixels aligned in the vertical direction. Then, an image, in which the rectangle-shaped images for right eye that are obtained through the division and the rectangle-shaped images for left eye that are obtained through the division are alternately arranged, is displayed on the screen of the upper LCD 22. A user views the image through the parallax barrier in the upper LCD 22, so that the images for right eye are viewed by the user's right eye and the images for left eye are viewed by the user's left eye. In this manner, a stereoscopically visible image is displayed on the screen of the upper LCD 22.

The lower LCD 12 is a display device for displaying an image in a planar manner (not in a stereoscopically visible manner), which is different from the upper LCD 22. In the present embodiment, the number of pixels is 320×240 dots (width×height). The lower LCD 12 displays an image in accordance with an instruction from (the GPU 313 of) the information processing section 31. Although an LCD is used as the display device in the present embodiment, any other display device such as a display device using an EL (Electro Luminescence), or the like may be used. In addition, a display device having any resolution may be used as the lower LCD 12.

(Configuration of Old Apparatus)

Next, the configuration of the game apparatus 110 (old apparatus) will be described. The game apparatus 110 is an earlier generation apparatus (old generation) of the same type as the game apparatus 10 (new apparatus) described above. The game apparatus 110 is capable of executing a game program stored in an exchangeable memory card or received from a server or another game apparatus, and displaying, on the screen, an image generated by 2-dimensional computer graphics (2DCG) using images and the like stored in advance. Hereinafter, the game apparatus 110 will be described focusing on the difference from the game apparatus 10.

Figure 2:
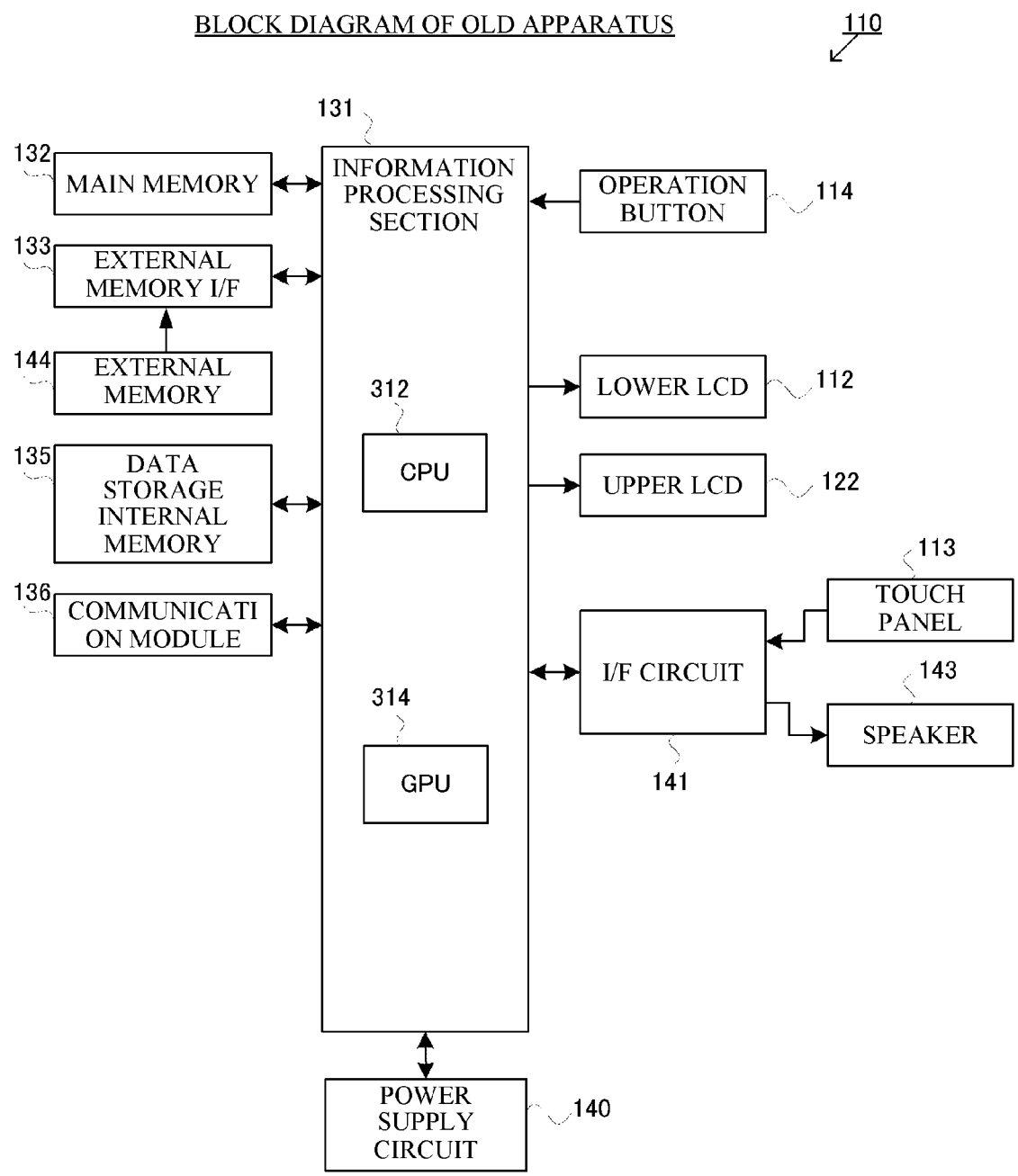
FIG. 2 is a block diagram showing an example of the internal configuration of a game apparatus 110 (old apparatus)

FIG. 2 shows the configuration of the game apparatus 110. As shown in FIG. 2, the game apparatus 110 includes an information processing section 131, a main memory 132, an external memory interface (external memory I/F) 133, a data storage internal memory 135, a communication module 136, a power supply circuit 140, an operation section 114, a lower LCD 112, an upper LCD 122, an interface circuit (I/F circuit) 141, a touch panel 113, and a speaker 143.

The main memory 132, the external memory I/F 133, the data storage internal memory 135, the communication module 136, the power supply circuit 140, the operation section 114, the lower LCD 112, the upper LCD 122, and the interface circuit 141, are connected to the information processing section 131. An external memory 144 is detachably connected to the external memory I/F 133. The touch panel 113 is connected to the interface circuit 141. Also, the speaker 143 is connected to the interface circuit 141 via an amplifier which is not shown.

The information processing section 131 is information processing means including the CPU 312 and the GPU 314.

The CPU 312 executes an old apparatus game program developed for the game apparatus 110 (old apparatus) and stored in a memory in the game apparatus 110 (for example, the external memory 144 or the data storage internal memory 135 connected to the external memory I/F 133), thereby executing processing based on said game program. As previously described, the CPU 312 of the game apparatus 110 is the same as that of the game apparatus 10 (new apparatus).

The GPU 314 is a drawing processing unit using 2-dimensional computer graphics (2DCG), and generates an image, based on an instruction from the CPU 312. As previously described, the GPU 314 of the game apparatus 110 is the same as that of the game apparatus 10 (new apparatus).

The main memory 132 is volatile storage means used as a work area or a buffer area for the information processing section 131 (the CPU 312).

The external memory 144 is nonvolatile storage means for storing an old apparatus game program to be executed by the information processing section 131. When the external memory 144 is connected to the external memory I/F 133, the information processing section 131 can load a program (the old apparatus game program) stored in the external memory 144. A predetermined process is performed by the program loaded by the information processing section 131 being executed.

The data storage internal memory 135 is composed of a non-volatile readable and writable memory, and is used for storing predetermined data.

The communication module 136 has a function of connecting to a wireless LAN, and a function of performing wireless communication with the same type of game apparatus in a predetermined communication method. The information processing section 131 can transmit data to or transmit data from another apparatus via the Internet and can transmit data to or transmit data from the same type of another game apparatus, by using the communication module 136.

The power supply circuit 140 controls power from the power supply (not shown) of the game apparatus 110, and supplies power to each unit of the game apparatus 110.

The speaker 143 outputs, as sound, a sound signal outputted from the I/F circuit 141 which has been amplified by an amplifier.

The touch panel 113 is mounted on the screen of the lower LCD 112. In the present embodiment, the touch panel 113 is a touch panel of resistive film type.

The I/F circuit 141 includes a sound control circuit for controlling the speaker 143 (amplifier), and a touch panel control circuit for controlling the touch panel 113. The sound control circuit performs D/A conversion on the sound signal, and converts the sound signal to a predetermined form of sound data. The touch panel control circuit generates a predetermined form of touch position data based on a signal outputted from the touch panel 113, and outputs the touch position data to the information processing section 131. The information processing section 131 acquires the touch position data, to recognize a position on which an input is made on the touch panel 113.

The operation section 114 includes various operation buttons (not shown). The operation section 114 outputs, to the information processing section 131, operation data indicating the input status of the operation buttons (i.e., whether or not each of them has been pressed). The information processing section 131 acquires the operation data from the operation section 114 to perform processing in accordance with the input on the operation buttons.

The upper LCD 122 is a display device that displays a planar image which is not a stereoscopic image (that is, a display device that is not capable of displaying a stereoscopic image). In the present embodiment, the number of pixels is 640×200 dots (width×height). The upper LCD 122 displays an image in accordance with an instruction from (the GPU 314 of) the information processing section 131.

The lower LCD 112 is a display device that displays a planar image which is not a stereoscopic image, as in the upper LCD 122. In the present embodiment, the number of pixels is 256×192 dots (width×height). The lower LCD 112 displays an image in accordance with an instruction from (the GPU 314 of) the information processing section 131.

(Flow of Process by Old Apparatus)

Next, with reference to FIG. 3, a game process executed by the game apparatus 110 (old apparatus) will be described. When the game apparatus 110 has been powered on, the CPU 312 of the game apparatus 110 executes a boot program stored in the data storage internal memory 135 or the like, thereby initializing each unit such as the main memory 132. Then, an old apparatus game program stored in the external memory 144 is loaded into the main memory 132, and the CPU 312 executes the old apparatus game program.

Figure 3:
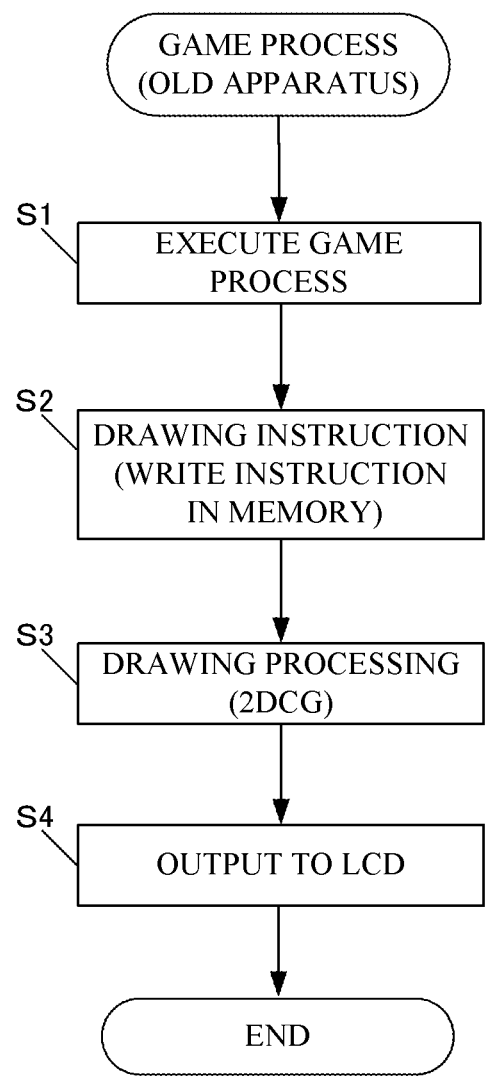
FIG. 3 is a flowchart showing an example of a game process executed by an information processing section 131 of the game apparatus 110.

FIG. 3 shows the flowchart of an example of the game process executed by the information processing section 131. The process of the flowchart in FIG. 3 is repeatedly executed every frame (for example, every 1/60 sec).

First, in step S1, the CPU 312 execute the game process by executing the old apparatus game program loaded into the main memory 132. Specifically, the CPU 312 executes the game process in accordance with operations for the operation section 114 and the touch panel 113 performed by a user, thereby progressing the game. Then, the process proceeds to step S2.

In step S2, the CPU 312 instructs the GPU 314 to draw an image representing the status of the game progressed in step S1. The details are as follows. Image data of objects (for example, background objects, user objects, and enemy objects) used for generating a 2-dimensional computer graphics (2DCG) image have been loaded in advance from the external memory 144 into the main memory 132. The CPU 312 writes, in the main memory 132, drawing instruction information indicating what combination of the objects is to be used, in what positional relationship (including front-back relationship) the objects are to be placed, and the like. Then, the process proceeds to step S3.

In step S3, the GPU 314 performs drawing processing by 2-dimensional computer graphics. Specifically, the GPU 314 performs drawing processing by 2-dimensional computer graphics in accordance with the drawing instruction information written in the main memory 132 in step S2, thereby generating one frame of 2DCG image data. Then, the process proceeds to step S4.

In step S4, the GPU 314 outputs the 2DCG image data generated in step S3 to the upper LCD 122 and the lower LCD 112. It is noted that the output of the 2DCG image data in step S4 is sequentially executed on a line-by-line basis of frame. Then, the process returns to step S1.

As described above, as processing of steps S1 to S4 is repeated, the game progresses in the game apparatus 110 (old apparatus), and 2-dimensional computer graphics images corresponding to the progression of the game are displayed on the upper LCD 122 and lower LCD 112.

(Flow of Process by Game Apparatus 10 (New Apparatus))

Next, with reference to FIG. 4 to FIG. 8, a game process executed by the game apparatus 10 (new apparatus) will be described. It is noted that in principle, the description of processes that are not directly relevant to the exemplary embodiments will be omitted.

(Memory Map)

Figure 4:
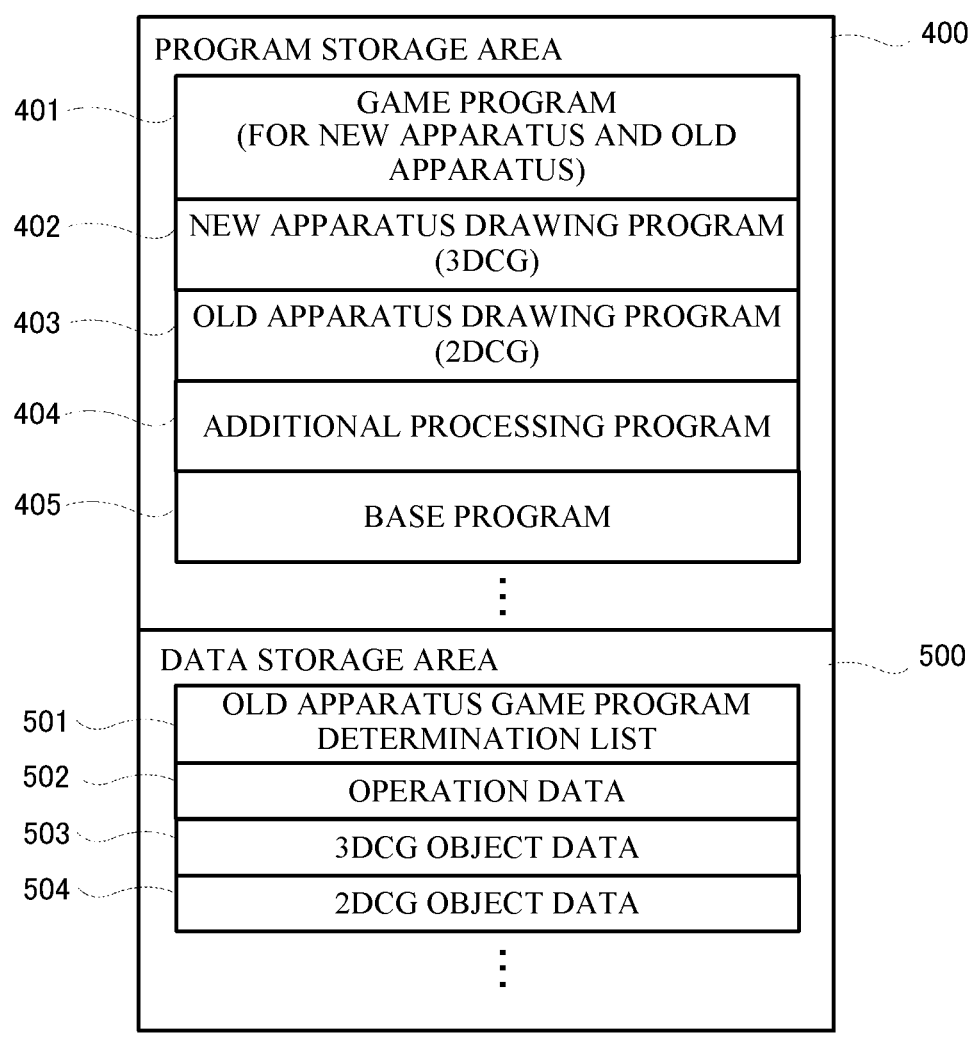
FIG. 4 shows an example of the memory map of a main memory 32 of the game apparatus 10.

First, data to be stored in the main memory 32 in the game process will be described. FIG. 4 shows an example of the memory map of the main memory 32 of the game apparatus 10. As shown in FIG. 4, the main memory 32 includes a program storage area 400 and a data storage area 500. A part of data for the program storage area 400 and the data storage area 500 has been stored in the external memory 44, the external memory 144, or the data storage internal memory 35, and are loaded and stored in the main memory 32 when the game process is executed.

In the program storage area 400, a game program 401, a new apparatus drawing program 402, an old apparatus drawing program 403, an additional processing program 404, a base program 405, and the like are stored.

The game program 401 is a program for executing a game process. When the game apparatus 10 executes a new apparatus game program, the new apparatus game program is stored as the game program 401 in the program storage area 400, and when the game apparatus 10 executes an old apparatus game program, the old apparatus game program is stored as the game program 401 in the program storage area 400.

The new apparatus drawing program 402 is a program for realizing drawing processing by 3-dimensional computer graphics, which generates a 3-dimensional image by taking an image of a virtual 3-dimensional space in which objects are placed, with a virtual camera. In addition, the new apparatus drawing program 402 can cause the virtual camera to function as a left virtual camera for taking an image for left eye which is to be viewed by a user with the left eye, and a right virtual camera for taking an image for right eye which is to be viewed by a user with the right eye, thereby generating stereoscopic images having parallax therebetween.

The old apparatus drawing program 403 is a program for realizing drawing processing by 2-dimensional computer graphics, which generates a 2-dimensional image by combining 2-dimensional images of various objects.

The additional processing program 404 is a program for realizing processing of steps S504 and S506 in FIG. 8 described later.

The base program 405 is a program for realizing processing such as determination of a game processing mode, which will be described later with reference to FIG. 5.

In the data storage area 500, an old apparatus game program determination list 501, operation data 502, 3DCG object data 503, 2DCG object data 504, and the like are stored.

The old apparatus game program determination list 501 is a list of game headers included in old apparatus game programs that can be executed by the game apparatus 10. It is noted that the game header is information for identifying each game program.

The operation data 502 indicates operations for the operation section 14 and the touch panel 13 performed by a user.

The 3DCG object data 503 is data about various objects to be placed in a virtual 3-dimensional space for generating a display image by 3-dimensional computer graphics, which indicates the positions, the directions, the shapes (polygon shapes), the colors (textures), and the like of the objects.

The 2DCG object data 504 is data of 2-dimensional images representing various objects used for generating a display image by 2-dimensional computer graphics.

(Mode Determination of Game Process)

Hereinafter, the game processing mode for the game apparatus 10 to execute a new apparatus game program is referred to as a "normal mode", and the game processing mode for the game apparatus 10 to execute an old apparatus game program is referred to as a "compatible mode". In the normal mode, images for a game for new apparatus are displayed on the upper LCD 22 and the lower LCD 12, and sound for a game for new apparatus is outputted from the speaker 43. In the compatible mode, images for a game for old apparatus are displayed on the upper LCD 22 and the lower LCD 12, and sound for a game for old apparatus is outputted from the speaker 43.

FIG. 5 is a flowchart showing an example of a process executed by the game apparatus 10 for determining in which processing mode a game program which is an execution target is to be executed, the normal mode or the compatible mode. Hereinafter, the determination process will be described.

When the game apparatus 10 has been powered on, the CPU 311 of the game apparatus 10 executes a boot program stored in the data storage internal memory 35 or the like, thereby initializing each unit such as the main memory 32. Then, the CPU 311 executes the base program 405 to perform the following process for determining the game processing mode.

First, in step S100, the CPU 311 determines whether or not an instruction to execute a game has occurred. Specifically, the CPU 311 determined whether or not the external memory 44 having stored therein a new apparatus game program or the external memory 144 having stored therein an old apparatus game program has been connected to the external memory I/F 33. If the CPU 311 has determined that the external memory 44 or 144 has been connected (YES in step S100), the process proceeds to step S200. In addition, the CPU 311 determines whether or not one of game programs (new apparatus game program or old apparatus game program) stored in the data storage internal memory 35 has been selected as an execution target. If the CPU 311 has determined that a game program has been selected (YES in step S100), the process proceeds to step S200.

In step S200, the CPU 311 loads the game program stored in the external memory (44 or 144) connected to the external memory I/F 33, into the main memory 32. It is noted that the game program (new apparatus game program or old apparatus game program) includes a game header which is identification information about the game program. Then, the process proceeds to step S300.

In step S300, the CPU 311 determines whether or not the game program (401) loaded into the main memory 32 in step S200 is to be executed in the compatible mode. Specifically, the CPU 311 determines whether or not the game header included in the game program loaded in step S200 matches one of the game headers included in the old apparatus game program determination list 501 of the main memory 32. If the result of the determination in step S300 is YES, the process proceeds to step S500. If the result of the determination is NO, the process proceeds to step S400.

Figure 6:
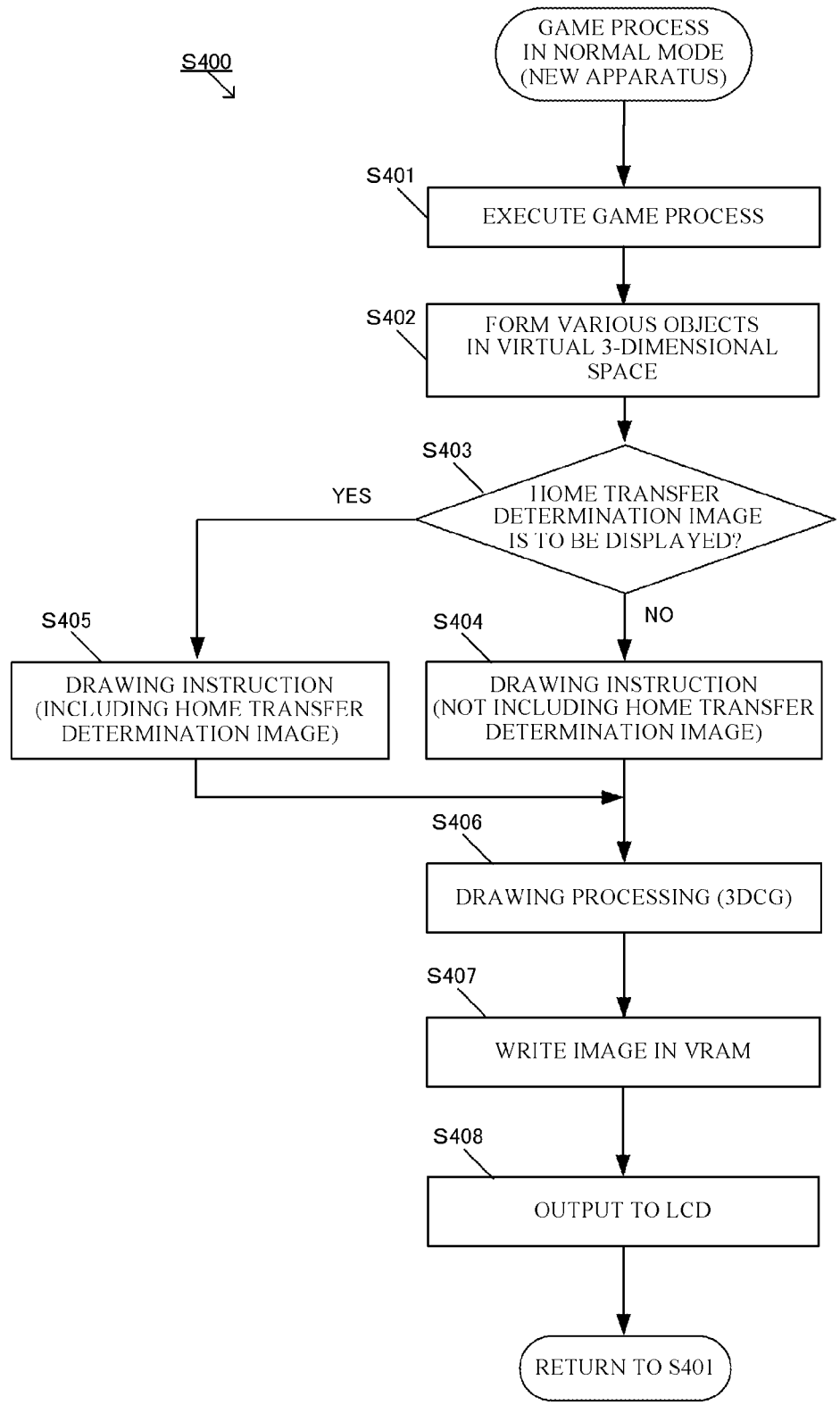
FIG. 6 is a flowchart showing an example of a game process in the normal mode performed in step S400 in FIG. 5.

In step S400, a game process in the normal mode is executed, which will be described later with reference to FIG. 6, whereby a game based on the new apparatus game program is executed and a user can play the game for new apparatus.

In step S500, a game process in the compatible mode is executed, which will be described later with reference to FIG. 8, whereby a game based on the old apparatus game program is executed and a user can play the game for old apparatus.

(Game Process in Normal Mode)

Hereinafter, with reference to FIG. 6, the game processing in the normal mode performed in step S400 in FIG. 5 will be described. FIG. 6 is a flowchart showing an example of the game process in the normal mode performed in step S400 in FIG. 5. The process of the flowchart in FIG. 6 is repeatedly executed every frame (for example, every 1/60 sec).

First, in step S401, the CPU 311 executes the game process by executing the new apparatus game program loaded into the main memory 32. Specifically, the CPU 311 determines operations for the operation section 14 and the touch panel 13 performed by a user, by referring to the operation data 502, and executes the game process in accordance with the operations, thereby progressing the game. Then, the process proceeds to step S402.

In step S402, the CPU 311 forms various objects in a virtual 3-dimensional space in accordance with the game progressed in step S401. Specifically, the CPU 311 forms various objects in a virtual 3-dimensional space in accordance with the progression of the game, by using the 3DCG object data 503. Then, the process proceeds to step S403.

Figure 7:
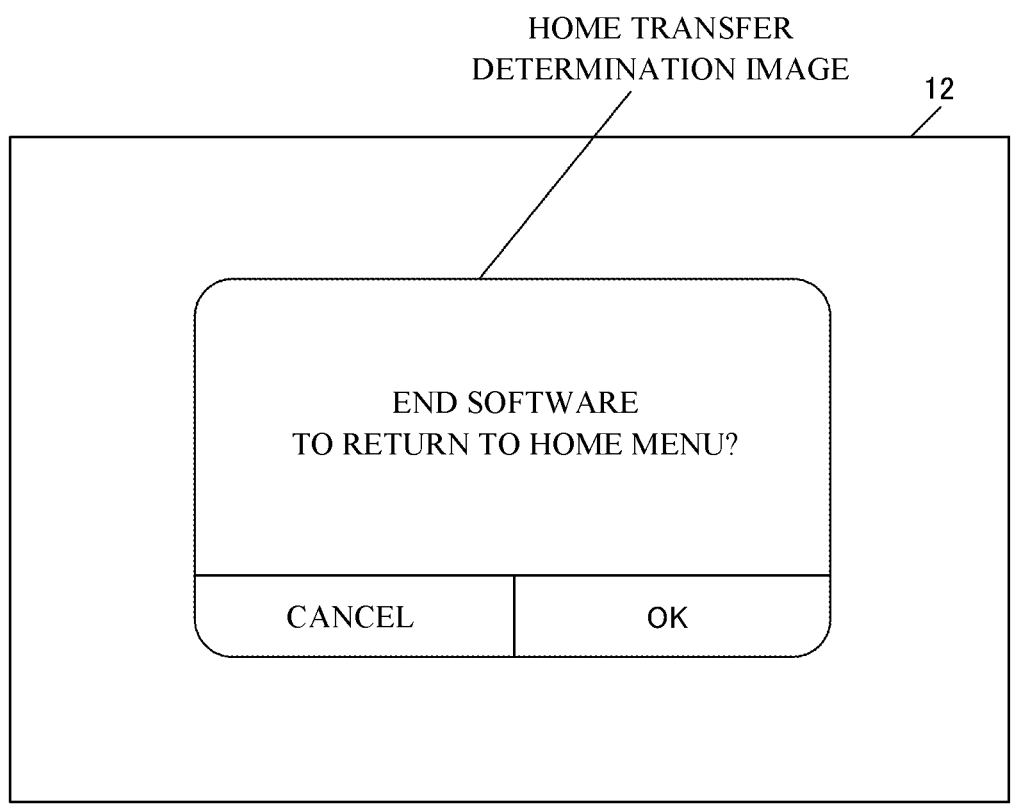
FIG. 7 shows an example of a home transfer determination image.

In step S403, the CPU 311 determines whether or not to display a home transfer determination image on the lower LCD 12. FIG. 7 shows an example of the home transfer determination image. As shown in FIG. 7, the home transfer determination image is an image for allowing a user to determine whether or not to transfer to a home menu (in which, for example, a user can select a program that can be executed by the game apparatus 10). If "OK" has been selected in the home transfer determination image, the game being executed is ended to transfer to the home menu, and if "Cancel" has been selected in the home transfer determination image, the game being executed is not ended but continues to be executed. Specifically, in step S403, if the home transfer determination image is to be displayed because a user has pressed the home button (not shown) of the operation section 14, or unless it is determined that the display of the home transfer determination image that is currently being displayed is to be ended (that is, unless the "cancel" is selected), the CPU 311 determines to display the home transfer determination image on the lower LCD 12. If the "OK" has been selected, the whole game process shown in FIG. 6 (step S400 in FIG. 5) is ended to transfer to the home menu. If the result of the determination in step S403 is YES, the process proceeds to step S405. If the result of the determination is NO, the process proceeds to step S404.

In step S404, the CPU 311 instructs the GPU 313 to draw the virtual 3-dimensional space by taking an image of the virtual 3-dimensional space in which various objects have been formed in step S402, with a virtual camera. Here, this instruction does not include an instruction to display the home transfer determination image. Then, the process proceeds to step S406.

In step S405, the CPU 311 instructs the GPU 313 to draw the virtual 3-dimensional space by taking an image of the virtual 3-dimensional space in which various objects have been formed in step S402, with a virtual camera. Here, this instruction includes an instruction to display the home transfer determination image. Then, the process proceeds to step S406.

In step S406, the GPU 313 performs drawing processing of taking an image of the virtual 3-dimensional space in which various objects have been formed in step S402, with a virtual camera, by using the new apparatus drawing program 402, in accordance with the instruction made in step S404 or S405, thereby generating images to be displayed on the upper LCD 22 and the lower LCD 12. The details are as follows. In the case where processing of step S406 is performed subsequent to step S404, the CPU 311 performs drawing processing of taking an image of the virtual 3-dimensional space in which various objects have been formed in step S402, with a virtual camera, thereby generating images, for the upper LCD 22 and the lower LCD 12, that do not include the home transfer determination image. On the other hand, in the case where processing of step S406 is performed subsequent to step S405, the CPU 311 performs drawing processing of taking an image of the virtual 3-dimensional space in which various objects have been formed in step S402, with a virtual camera, thereby generating an images, for the upper LCD 22, that does not include the home transfer determination image. In addition, in the case where processing of step S406 is performed subsequent to step S405, the CPU 311 takes an image of the virtual 3-dimensional space in which various objects have been formed in step S402, with a virtual camera, and adds the home transfer determination image to the taken image, thereby generating an images, for the lower LCD 12, that includes the home transfer determination image. Then, the process proceeds to step S407. It is noted that, in the case where a game program configured to display a stereoscopic image on the upper LCD 22 is executed, in step S406, upon generation of a stereoscopic image for the upper LCD 22, the GPU 313 causes the virtual camera to function as a left virtual camera for taking an image for left eye and a right virtual camera for taking an image for right eye (that is, function as a virtual stereo camera), thereby taking an image of the virtual 3-dimensional space.

In step S407, the GPU 313 writes (buffers) the images drawn in step S406, in the VRAM 315. Specifically, of the images drawn in step S406, the GPU 313 writes one frame of image to be displayed on the upper LCD 22, in a predetermined area of the VRAM 315, and writes one frame of image to be displayed on the lower LCD 12, in a predetermined area of the VRAM 315. Then, the process proceeds to step S408. It is noted that, in the case where a stereoscopic image composed of an image for left eye and an image for right eye is to be displayed on the upper LCD 22, an image for left eye and an image for right eye composing one frame of stereoscopic image are written in the VRAM 315.

In step S408, the GPU 313 outputs the images (image data) written in the VRAM 315 in step S407, to the upper LCD 22 and the lower LCD 12. As a result, game images based on the new apparatus game program are displayed on the upper LCD 22 and the lower LCD 12. Then, the process returns to step S401, and the process of steps S401 to S408 is repeated until the game is ended.

(Game Processing in Compatible Mode)

Hereinafter, with reference to FIG. 8, the game processing in the compatible mode performed in step S500 in FIG. 5 will be described. FIG. 8 is a flowchart showing an example of the game process in the compatible mode performed in step S500 in FIG. 5. The process of the flowchart in FIG. 8 is repeatedly executed every frame (for example, every 1/60 sec).

First, in step S501, the CPU 312 executes the game process by executing the game program 401 (old apparatus game program) in the main memory 32. Specifically, the CPU 312 executes the game process in accordance with operations for the operation section 14 and the touch panel 13 performed by a user, thereby progressing the game. It is noted that the processing performed by the CPU 312 of the game apparatus 10 in step S501 is the same as the processing performed by the CPU 312 of the game apparatus 110 (old apparatus) in step S1 in FIG. 3. Then, the process proceeds to step S502.

In step S502, the CPU 312 instructs the GPU 314 to draw an image representing the status of the game progressed in step S501. The details are as follows. The CPU 312 writes, in the main memory 32, drawing instruction information indicating what combination of objects is to be used, in what positional relationship (including front-back relationship) the objects are to be placed, and the like for generating a 2-dimensional computer graphics image. It is noted that the processing performed by the CPU 312 of the game apparatus 10 in step S502 is the same as the processing performed by the CPU 312 of the game apparatus 110 in step S2 in FIG. 3. Then, the process proceeds to step S503.

In step S503, the GPU 314 performs drawing processing by 2-dimensional computer graphics by using the old apparatus drawing program 403. Specifically, the GPU 314 performs drawing processing by 2-dimensional computer graphics, by using the 2DCG object data 504, in accordance with the drawing instruction information written in the main memory 32 in step S502, thereby generating one frame of 2DCG image data to be displayed on each of the upper LCD 22 and the lower LCD 12. It is noted that the processing performed by the GPU 314 of the game apparatus 10 in step S503 is the same as the processing performed by the GPU 314 of the game apparatus 110 in step S3 in FIG. 3. Then, the process proceeds to step S504.

In step S504, the CPU 311 performs predetermined image processing for the 2DCG image data generated in step S503, by using the additional processing program 404. In the present embodiment, the CPU 311 performs image processing (resolution converting processing) of converting the resolution of the image data generated in step S503 from the resolution used for outputting image data to the upper LCD 122 and the lower LCD 112 of the game apparatus 110, to the resolution used for outputting image data to the upper LCD 22 and the lower LCD 12 of the game apparatus 10. In addition, in the present embodiment, the CPU 311 performs image processing (filtering) of brightness-relevant adjustment in order to prevent photosensitive epilepsy. Then, the process proceeds to step S505.

In step S505, the CPU 311 determines whether or not to display the home transfer determination image (see FIG. 7) on the lower LCD 12. Specifically, in step S505, similarly to step S403 in FIG. 6, if the home transfer determination image is to be displayed because a user has pressed the home button (not shown) of the operation section 14, or unless it is determined that the display of the home transfer determination image that is currently being displayed is to be ended (that is, unless the "Cancel" is selected), the CPU 311 determines to display the home transfer determination image on the lower LCD 12. If the "OK" has been selected, the whole game process shown in FIG. 8 (step S500 in FIG. 5) is ended to transfer to the home menu. If the result of the determination in step S505 is YES, the process proceeds to step S506. If the result of the determination is NO, the process proceeds to step S507.

In step S506, the CPU 311 performs processing of superimposing the home transfer determination image on one, of the two 2DCG images subjected to the predetermined image processing in step S504, that is to be displayed on the lower LCD 12. Then, the process proceeds to step S507.

In step S507, the CPU 311 performs a drawing instruction to the GPU 313. The details are as follows. In the case where processing of step S507 is performed subsequent to step S505, the CPU 311 instructs the GPU 313 to place, as a texture, each of the two 2DCG images generated (processed) in step S504, in a virtual 3-dimensional space (application to polygon), and take images of the placed texture with a virtual camera by orthogonal projection, thereby drawing images to be displayed on the upper LCD 22 and the lower LCD 12. On the other hand, in the case where processing of step S507 is performed subsequent to step S506, the CPU 311 instructs the GPU 313 to place, as a texture, the 2DCG image to be displayed on the lower LCD 12 generated (processed) in step S506 (i.e., the image on which the home transfer determination image has been superimposed), in a virtual 3-dimensional space (application to polygon), and take an image of the placed texture with a virtual camera by orthogonal projection, thereby drawing an image to be displayed on the lower LCD 12. In addition, in the case where processing of step S507 is performed subsequent to step S506, the CPU 311 instructs the GPU 313 to place, as a texture, the 2DCG image to be displayed on the upper LCD 22 generated (processed) in step S506 (i.e., the image on which the home transfer determination image is not superimposed), in a virtual 3-dimensional space (application to polygon), and take an image of the placed texture with a virtual camera by orthogonal projection, thereby drawing an image to be displayed on the upper LCD 22. Then, the process proceeds to step S508.

In step S508, the GPU 313 draws 2DCG images to be displayed on the upper LCD 22 and the lower LCD 12 by 3-dimensional computer graphics, by using the new apparatus drawing program 402, in accordance with the instruction from the CPU 311 in step S507. Then, the process proceeds to step S509. It is noted that as described in step S507, the drawing processing by 3DCG in step S508 is processing of taking an image of a texture that is a 2DCG image with a virtual camera by orthogonal projection. Therefore, the images drawn in step S508 are substantially the same as images drawn by 2-dimensional computer graphics. As a result, stereoscopic display cannot be provided on the upper LCD 22.

In step S509, the GPU 313 writes (buffers) the images drawn in step S508, in the VRAM 315. Specifically, of the images drawn in step S508, the GPU 313 writes one frame of image to be displayed on the upper LCD 22, in a predetermined area of the VRAM 315, and writes one frame of image to be displayed on the lower LCD 12, in a predetermined area of the VRAM 315. Then, the process proceeds to step S510.

In step S510, the GPU 313 outputs the images (image data) written in the VRAM 315 in step S509, to the upper LCD 22 and the lower LCD 12. As a result, game images based on the old apparatus game program are displayed on the upper LCD 22 and the lower LCD 12. Then, the process returns to step S501, and the process of steps S501 to S510 is repeated until the game is ended.

As described above, in the present embodiment, whether a game program that is an execution target is a new apparatus game program or an old apparatus game program is determined. If the game program is a new apparatus game program, a game process is executed in the normal mode, and if the game program is an old apparatus game program, a game process is executed in the compatible mode (see FIG. 5). In the case where a game process is executed in the compatible mode, the old apparatus game program is executed by using the same CPU (312) as that of the old apparatus (game apparatus 110), and a game image (2DCG image) for old apparatus is generated by using the same GPU (314) as that of the old apparatus, once (steps S501 to S503 in FIG. 8). Thereafter, the CPU 311, which executes the game process and the like in the normal mode (see FIG. 6), performs various additional processings for the game image for old apparatus (steps S504 to S506), and then the GPU 313, which executes drawing processing in the normal mode, performs drawing processing for the game image subjected to the various additional processings (steps S507 and S508), thereby generating images to be displayed on the upper LCD 22 and the lower LCD 12.

Thus, according to the present embodiment, a display image generated by emulation as in conventional technique is not used, but a display image generated by processing based on the same architecture as that of a conventional apparatus (old apparatus) is used. Therefore, when an old apparatus game program is executed, the display image does not depend on the perfection level of emulation. As a result, according to the present embodiment, even if the drawing unit (GPU 313) of the game apparatus 10 (new apparatus) has an architecture to use a different drawing method from that of the drawing unit (GPU 314) of the game apparatus 110 (old apparatus), it is possible to execute software for old apparatus and generate a display image with a high perfection level.

(Modification)

In the above embodiment, the game apparatus 110 is an earlier generation apparatus of the same type as the game apparatus 10. However, the game apparatus 110 may be a game apparatus of different type from the game apparatus 10.

In the above embodiment, the game apparatus 10 employs a 3DCG drawing unit, and the game apparatus 110 employs a 2DCG drawing unit. However, for example, the exemplary embodiments are applicable to the case where the game apparatus 10 has a drawing unit for drawing a vector image, and the game apparatus 110 has a drawing unit for drawing a raster image.

In the above embodiment, the game apparatus 110 has only an architecture (2DCG drawing unit) that is incompatible with the architecture of the game apparatus 10. However, the exemplary embodiments are applicable to the case where the game apparatus 110 further has an architecture (3DCG drawing unit) that is compatible with the architecture of the game apparatus 10. This is because, after all, it is desirable that the game apparatus 10 ensures compatibility with the incompatible architecture (2DCG drawing unit) in order to make the game apparatus 10 compatible with the game apparatus 110.

In the above embodiment, in the normal mode and the compatible mode, the home transfer determination image is displayed on the lower LCD 12. However, in the normal mode and the compatible mode, the home transfer determination image may be displayed on the upper LCD 22. Alternatively, the home transfer determination image may be displayed on both the upper LCD 22 and the lower LCD 12.

In the above embodiment, in the normal mode and the compatible mode, a game space is displayed on the upper LCD 22 and the lower LCD 12. Here, an image of the game space displayed on the lower LCD 12 may be an operation image on which a user performs an operation by using the touch panel 13.

Figure 8:
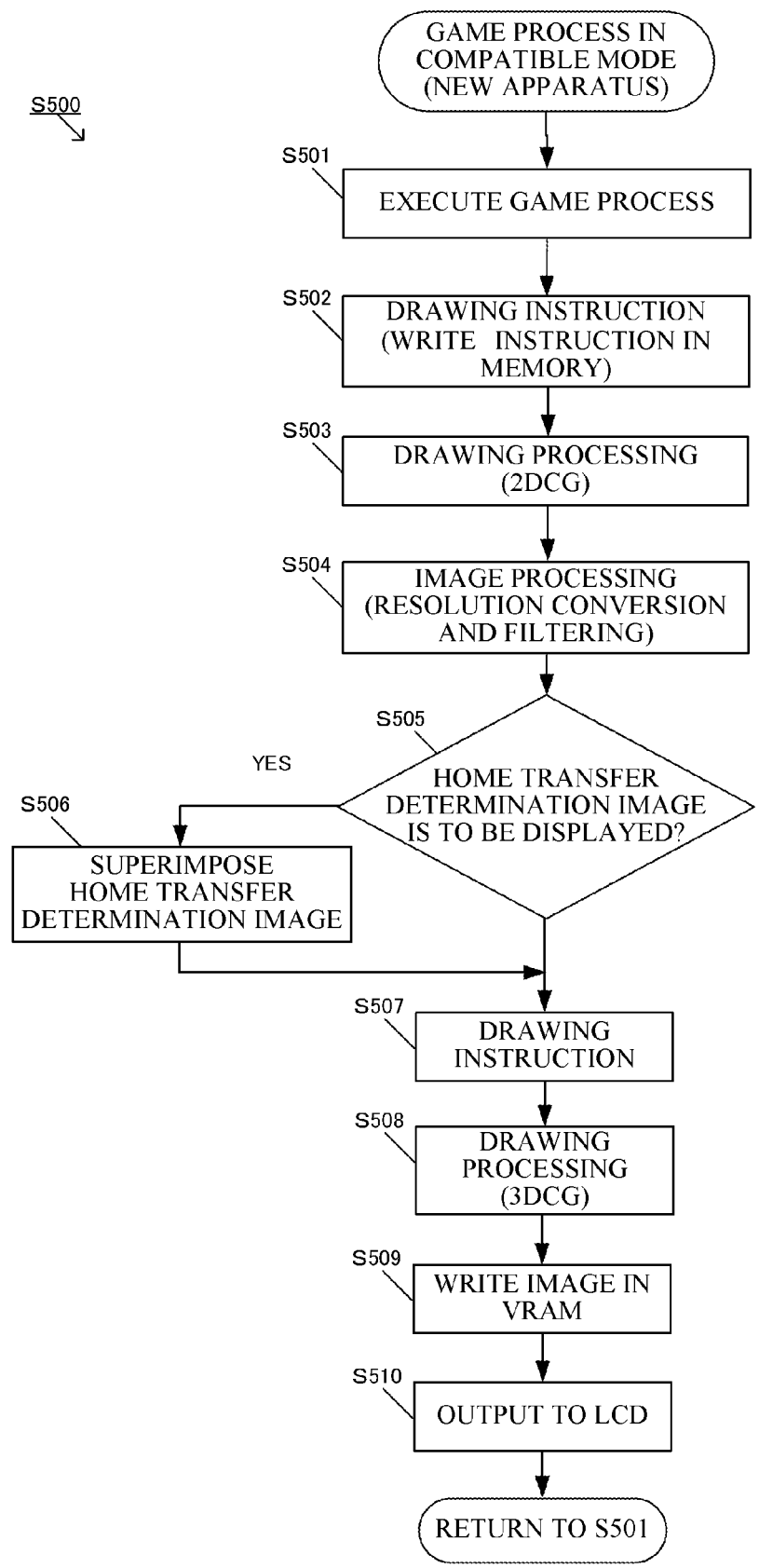
FIG. 8 is a flowchart showing an example of a game process in the compatible mode performed in step S500 in FIG. 5.

In the above embodiment, the CPU 311 executes the additional processing of steps S504 and S506 in FIG. 8. However, the GPU 313 or a dedicated device may execute the additional processing. Alternatively, several devices may share execution of the additional processing.

In the game program of the above embodiment, images are displayed on both the upper LCD 22 and the lower LCD 12. However, a game program in which an image is displayed on only one of the LCDs may be used. In this case, the home transfer determination image may be displayed on the LCD on which the image is displayed, or may be displayed on the other LCD on which the image is not displayed.

In the above embodiment, drawing processing has been described. However, other than this, the exemplary embodiments may be applied to processing of generating sound, for example. For example, it will be assumed that the old apparatus outputs sound by using one speaker, and the new apparatus outputs sound with high acoustic effect by using a plurality of speakers (for example, six speakers). In this case, it may be considered that an SPU (Sound Processing Unit) for generating data of sound to be outputted from the one speaker of the old apparatus, and an SPU for generating data of sound to be outputted from the plurality of speakers of the new apparatus are greatly different in their processing manners of operation (and their configurations). Accordingly, the manner of instructions performed by the CPU of the old apparatus to the SPU of the old apparatus is greatly different from the manner of instructions performed by the CPU of the new apparatus to the SPU of the new apparatus. Therefore, the exemplary embodiments are well worth being applied to such a case.

Although the game apparatus 10 is used in the above embodiment, the exemplary embodiments are not limited to the game apparatus 10. For example, the exemplary embodiments are applicable to portable information terminals such as a mobile phone, a personal handy-phone system (PHS), or a PDA. In addition, the exemplary embodiments are applicable to a stationary game apparatus, a personal computer, or the like.

In the above embodiment, all the steps of processing are executed by one game apparatus 10. However, a plurality of apparatuses that can communicate with each other by wire or wirelessly may share the execution of the processing.

The order of steps, and the like used in the above information processes of the above embodiment are merely examples. It should be understood that the order of steps, and the like may be set in any manner without departing from the scope of the exemplary embodiments.

In addition, in the above embodiment, the information processing programs to be executed by the game apparatus 10 are supplied to the game apparatus 10 via a storage medium such as the external memory 44. However, the information processing programs may be supplied to the game apparatus 10 by wire or wirelessly. In addition, the information processing programs may be stored in advance in a nonvolatile storage device (e.g., the data storage internal memory 35) inside the game apparatus 10. It is noted that instead of such a nonvolatile memory, a CD-ROM, a DVD, a similar optical disc storage medium, a flexible disc, a hard disc, an optical magnetic disc, a magnetic tape, or the like may be used as an information storage medium for storing the information processing programs. In addition, a volatile memory for temporarily storing the information processing programs may be used as an information storage medium for storing the information processing programs.

While the exemplary embodiments have been described in detail, the foregoing description is in all aspects illustrative and not restrictive. It will be understood that numerous other modifications and variations can be devised without departing from the scope of the exemplary embodiments.

What is claimed is:

1. A non-transitory computer-readable storage medium having stored therein an information processing program which is executed by one or more processors of an information processing apparatus capable of executing processing in a normal mode and a compatible mode, the normal mode being a processing mode in which processing is executed based on a first architecture for the information processing apparatus, the compatible mode being a processing mode in which processing is executed based on a second architecture for another information processing apparatus, which is different from the first architecture, the information processing program, when executed, causing the information processing apparatus to provide functionality comprising:

executing the processing with a first processing section based on the first architecture, the first processing section including a first central processing unit and a first graphics processing unit; and executing the processing with a second processing section based on the second architecture, wherein the second processing section is provided separately from the first processing section and the second processing section includes a second central processing unit and a second graphics processing unit, which are distinct from the first central processing unit and the first graphics processing unit, respectively, in the normal mode, inputting, by the first processing section, first result data obtained by executing the processing based on the first architecture, to an output section configured to output inputted data to a user, and in the compatible mode, inputting, by the second processing section, second result data obtained by executing the processing based on the second architecture, to the first processing section, and inputting, by the first processing section, the second result data inputted from the second processing section, to the output section, in a manner adapting the second result data to input of the output section.

2. The non-transitory computer-readable storage medium having stored therein the information processing program according to claim 1, wherein the first architecture and the second architecture are architectures for generating images, the first result data and the second result data are image data, and the output section displays an image to the user.

3. The non-transitory computer-readable storage medium having stored therein the information processing program according to claim 2, wherein the first architecture is an architecture for generating a 3-dimensional CG image by 3-dimensional computer graphics, and the second architecture is an architecture for generating a 2-dimensional CG image by 2-dimensional computer graphics.

4. The non-transitory computer-readable storage medium having stored therein the information processing program according to claim 3, wherein the first graphics processing unit is configured to generate data of a 3-dimensional CG image by 3-dimensional computer graphics, as the first result data;

the first central processing unit is configured to perform operation of determining processing instructions for generating the 3-dimensional CG image, and instruct the first graphics processing unit to generate data of the 3-dimensional CG image corresponding to the determined processing instructions;
the second graphics processing unit is configured to generate data of a 2-dimensional CG image by 2-dimensional computer graphics, as the second result data; and
the second central processing unit is configured to perform operation of determining processing instructions for generating the 2-dimensional CG image, and instruct the second graphics processing unit to generate data of the 2-dimensional CG image corresponding to the determined processing instructions.

5. The non-transitory computer-readable storage medium having stored therein the information processing program according to claim 4, wherein
the manner in which the first central processing unit instructs the first graphics processing unit to generate data of the 3-dimensional CG image is different from the instruction manner in which the second processing unit instructs the second graphics processing unit to generate data of the 2-dimensional CG image.

6. The non-transitory computer-readable storage medium having stored therein the information processing program according to claim 2, wherein
in the compatible mode, predetermined additional processing is performed, by the first processing section, for the second result data inputted from the second processing section, and the second result data is input, by the first processing section, to the output section, in the manner adapting the second result data to input of the output section.

7. The non-transitory computer-readable storage medium having stored therein the information processing program according to claim 6, wherein
the predetermined additional processing is processing of adding a predetermined image to an image represented by the second result data.

8. The non-transitory computer-readable storage medium having stored therein the information processing program according to claim 6, wherein
the predetermined additional processing is processing of performing predetermined image adjustment for an image represented by the second result data.

9. The non-transitory computer-readable storage medium having stored therein the information processing program according to claim 1, wherein
the other information processing apparatus is older than the information processing apparatus.

10. The non-transitory computer-readable storage medium having stored therein the information processing program according to claim 1, wherein
the information processing apparatus is a game apparatus.

11. An information processing apparatus capable of executing processing in a normal mode and a compatible mode,
the normal mode being a processing mode in which processing is executed based on a first architecture for the information processing apparatus,
the compatible mode being a processing mode in which processing is executed based on a second architecture for another information processing apparatus, which is different from the first architecture,
the information processing apparatus comprising:
a first processing section, comprising a first central processing unit and a first graphics processor, configured to execute the processing based on the first architecture; and
a second processing section, comprising a second central processing unit and a second graphics processor, configured to execute the processing based on the second architecture, wherein the second processing section including the second central processing unit and the second graphics processor is provided separately from the first processing section including the first central processing unit and the first graphics processor,
in the normal mode, the first processing section is configured to input first result data obtained by executing the processing based on the first architecture, to an output section configured to output inputted data to a user, and
in the compatible mode,
the second processing section is configured to input second result data obtained by executing the processing based on the second architecture, to the first processing section, and
the first processing section is configured to input the second result data inputted from the second processing section, to the output section, in a manner adapting the second result data to input of the output section.

12. An information processing method capable of executing processing in a normal mode and a compatible mode,
the normal mode being a processing mode in which processing is executed based on a first architecture for the information processing method,
the compatible mode being a processing mode in which processing is executed based on a second architecture for another information processing method, which is different from the first architecture, and
the information processing method comprising:
in the normal mode, inputting, by a first processing device comprising a first central processing unit and a first graphics processing unit, first result data obtained by executing the processing based on the first architecture, to an output section configured to output inputted data to a user; and
in the compatible mode, inputting, by a second processing device comprising a second central processing unit and a second graphics processing unit, second result data obtained by executing the processing based on the second architecture to the first processing device, and inputting, by the first processing device, the second result data inputted from the second processing device to the output section, in a manner adapting the second result data to input of the output section, wherein
the second processing device is provided separately from the first processing device and the second central processing unit and the second graphics processing unit are distinct from the first central processing unit and the first graphics processing unit, respectively.

13. An information processing system capable of executing processing in a normal mode and a compatible mode,
the normal mode being a processing mode in which processing is executed based on a first architecture for the information processing system,
the compatible mode being a processing mode in which processing is executed based on a second architecture for another information processing system, which is different from the first architecture, the information processing system comprising:
  a first processing device, comprising a first central processing unit and a first graphics processing unit, configured to execute the processing based on the first architecture; and
  a second processing device, comprising a second central processing unit and a second graphics processing unit, configured to execute the processing based on the second architecture, wherein the second processing device is provided separately from the first processing device and the second central processing unit and the second graphics processing unit are distinct from the first central processing unit and the first graphics processing unit, respectively,
in the normal mode, the first processing device is configured to input first result data obtained by executing the processing based on the first architecture, to an output section configured to output inputted data to a user, and
in the compatible mode,
  the second processing device is configured to input second result data obtained by executing the processing based on the second architecture, to the first processing device, and
  the first processing device is configured to input the second result data inputted from the second processing device, to the output section, in a manner adapting the second result data to input of the output section.

14. The information processing apparatus of claim 11, wherein
  the first graphics processor is configured to generate 3-dimensional images; and
  the second graphics processor is configured to generate 2-dimensional images.

15. The information processing apparatus of claim 11, wherein
  the first graphics processor is configured to generate vector images; and
  the second graphics processor is configured to generate raster images.

16. The non-transitory computer-readable storage medium having stored therein the information processing program according to claim 1, wherein the first result data and the second result data are image data, and adapting the second result data to input of the output section includes applying a filter to adjust image brightness of image represented by the second result data.

17. The non-transitory computer-readable storage medium having stored therein the information processing program according to claim 1, wherein
  the second result data includes a 2-dimensional CG image, and
  in the compatible mode, the 2-dimensional CG image is received by the first processing section, and the first central processing unit instructs the first graphics processing unit to (1) place, as texture, the received 2-dimensional CG image in a virtual three-dimensional space, (2) take an image of the placed texture with a virtual camera, and (3) output the taken image to the output section.

* * * * *